INVENTOR
WILLIAM ARTHUR WARD

BY  Rines and Rines

ATTORNEYS

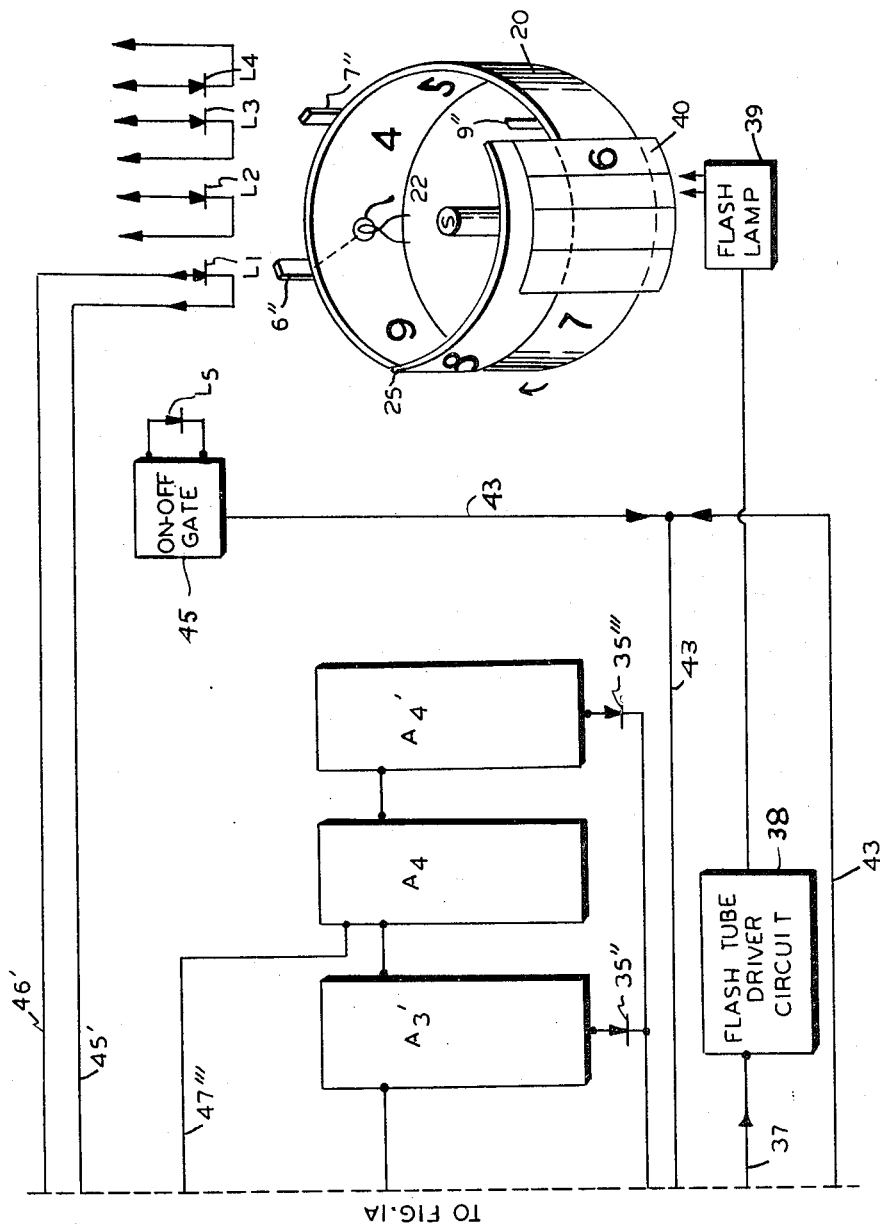

Dec. 27, 1966 W. A. WARD 3,294,959
ELECTRICAL SYSTEM HAVING ROTATABLE INDICATOR DRUM FOR
DISPLAYING STORED DATA
Original Filed June 27, 1962 7 Sheets-Sheet 4

INVENTOR
WILLIAM ARTHUR WARD

BY *Rines and Rines*

ATTORNEYS

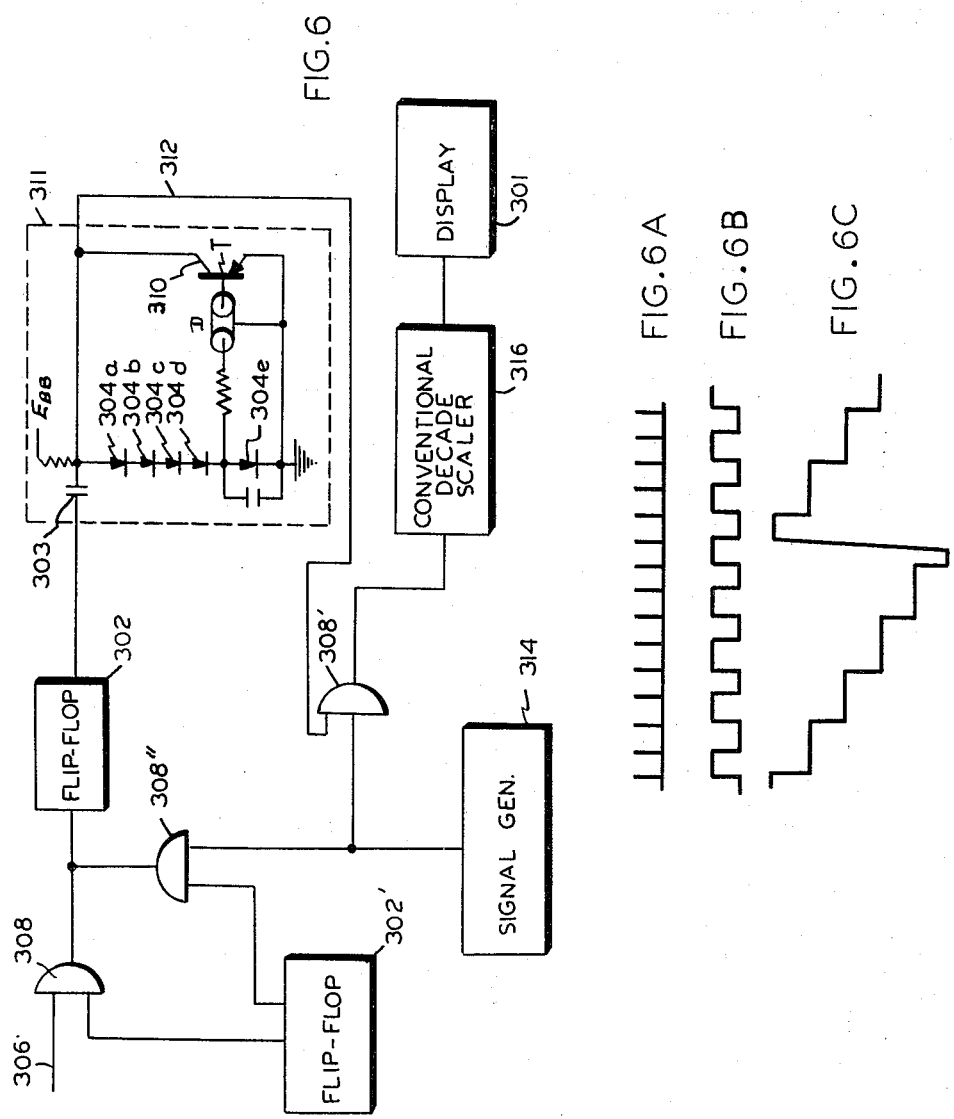

United States Patent Office 3,294,959
Patented Dec. 27, 1966

3,294,959
ELECTRICAL SYSTEM HAVING ROTATABLE INDICATOR DRUM FOR DISPLAYING STORED DATA
William Arthur Ward, 71 Deerfield Road, Norwood, Mass. 02062
Continuation of application Ser. No. 205,763, June 27, 1962. This application Mar. 14, 1966, Ser. No. 534,246
4 Claims. (Cl. 235—92)

This application is a continuation of application Serial No. 205,763, filed June 27, 1962.

The present invention relates to impulse counting-and-display systems, and more particularly, to counting circuits and apparatus adapted for such uses as digital voltmeters, electrical impulse counters and the like.

Numerous types of digital voltmeters have been proposed embodying counting circuits that count impulses converted from a signal voltage amplitude in a manner such that the number of counted impulses, over a predetermined time interval, for example, corresponds to the signal amplitude, thereby to provide a digital reading or other indication of the voltage amplitude. In such prior-art devices, the counting circuits associated with the digital voltmeter generally embody decade chains of the binary flip-flop type provided with conventional counting indicators. Other types of prior-art counter and similar apparatus apart from digital voltmeters also embody such binary counting circuits. Binary flip-flop circuits of this character are quite complex and expensive, requiring numerous electrical components. As an illustration, a typical present-day transistorized decade counter, including the specific types hereinafter identified, requires eight transistors together with a large number of diodes for reset purposes, and at least one transistor per digit for turning the indicator lamp or other device on or off, as required. In the case of digital voltmeters, many require stepping switches and the like having numerous moving parts and again involving complex circuitry and large numbers of transistors and other components.

An object of the present invention is to provide a new and improved counting-and-display system useful for digital voltmeter applications and for more general counting purposes, as well, that shall not be subject to the above-described disadvantages; but that, to the contrary, shall embody circuits requiring only a minimal number of transistors and diodes or the like, and that obviates the necessity for complex circuitry, including the transistor amplifiers for controlling the display.

A further object is to provide a new and improved counting circuit, particularly adapted for digital voltmeters and the like, but also of more general utility, as well.

Another object is to provide a new and improved counting apparatus that enables very high-speed counting, if desired.

Still a further object is to provide a novel display system particularly adapted for digital-voltage indication and other counting displays, embodying the use of periodically flashed lamps and the like.

Other and further objects will be explained hereinafter and will be more particularly pointed out in the appended claims.

The invention will now be described in connection with the accompanying drawing, FIGS. 1A and 1B of which are a combined block and schematic circuit diagram illustrating the invention as applied to a digital voltmeter, constructed in accordance with a preferred embodiment of the invention;

FIG. 6 is a combined circuit and block diagram of still a further modification;

FIGS. 6A, 6B and 6C are explanatory waveforms; and

Figure 1A:
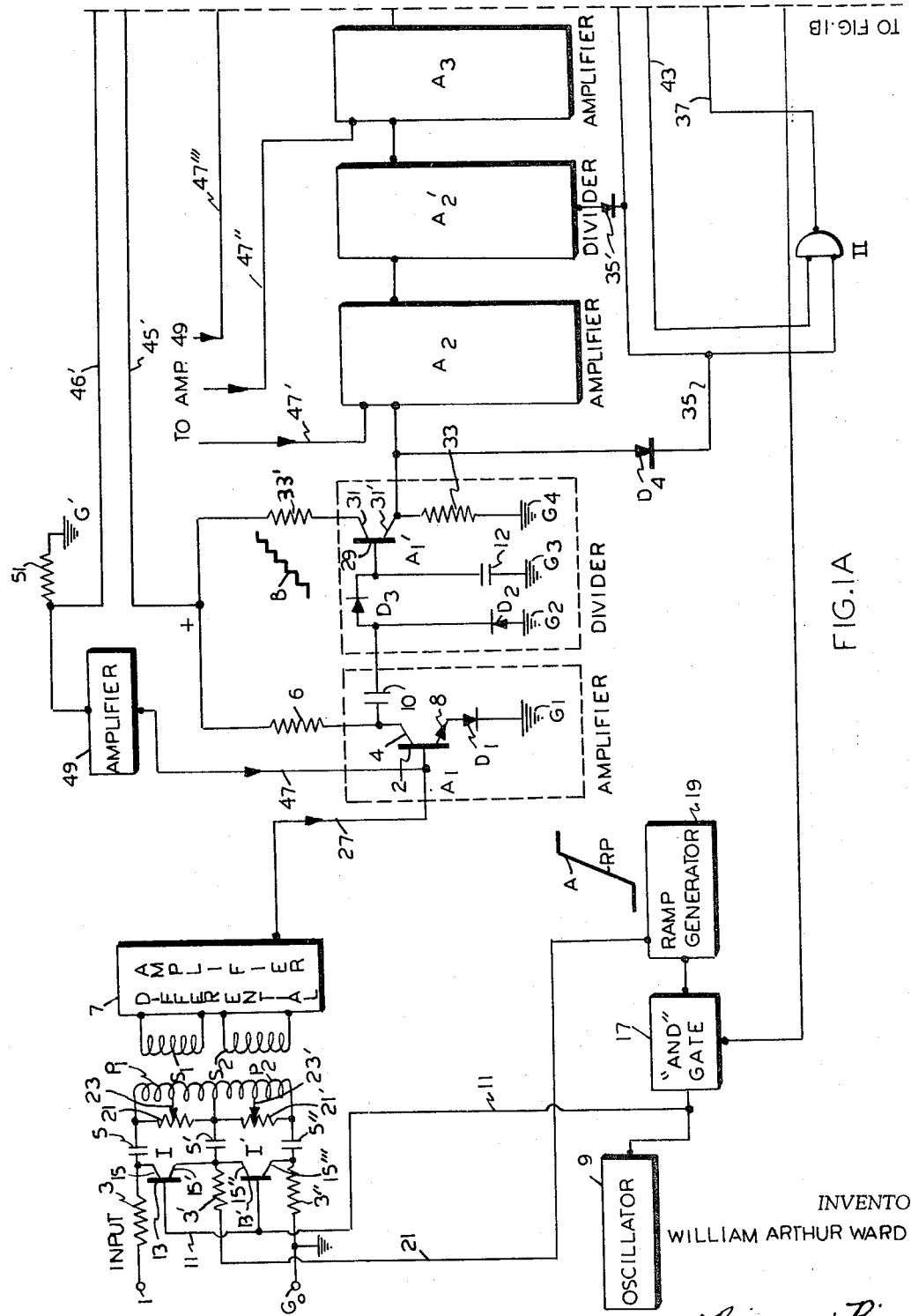

It is to be understood, however, that the counting circuit, the display assembly and other components shown in the drawings may clearly be used in other applications where the advantages of these subcombinations may be desired, though they are particularly advantageous in their combined use in the digital voltmeter or the counter circuit of the present invention.

An input signal, such as a voltage signal the amplitude of which is to be indicated in digital form, is applied at input terminal 1, labeled "INPUT" and fed through a resistor 3 and a capacitor 5 to the upper terminal of a primary winding $P_1$ of a first transformer $P_1$-$S_1$. The secondary winding $S_1$ of this transformer is shown connected to a differential amplifier stage 7, later described. An oscillator 9 generates a large number of pulses that are fed by conductor 11 to the base electrodes 13 and 13' of a pair of bi-lateral transistors I, I', the respective collector (or emitter) electrodes 15, 15''' and emitter (or collector) electrodes 15' and 15'' serve to enable bi-lateral conduction thereof, as is well known. Other types of relay devices may also be used though the bi-lateral transistor has the advantages of not requiring preamplifiers, as in conventional circuits of this character.

The oscillator 9 also feeds through an "and" gate 17, as of the type hereinafter discussed, to drive a ramp generator 19 that produces an upwardly sloping impulse, shown at waveform A, which is fed by conductor 21 through a further resistor 3' to the collector electrodes 15' and 15'' of the respective transistors I and I', and thence through a further capacitor 5' to the lower terminal of the primary winding $P_1$. The gate may be of the well-known type described, for example, on pages 125–137 of the 5th edition of the General Electric Company "Transistor Manual"; and the ramp generator may be of the type described on page 142 thereof. Shunted across the primary winding $P_1$ is a resistor 21 the potential at different points of which may be tapped off by a slider 23 connected to an intermediate point, preferably the midpoint, of the primary winding $P_1$ for balancing the base current of the transistor I. The transistor I will thus have applied to its respective collector and emitter electrodes 15 and 15' the input voltage from terminal 1 and the ramp or sloped voltage of waveform A from the ramp generator 19. There will accordingly result in the primary winding $P_1$ a train of pulses, which may be positive for input-signal amplitudes, corresponding to certain values of the ramp or sloped waveform A above a particular reference point RP, such as zero or ground potential.

Negative pulses, however, should be produced for values of input signal less than or below such reference point RP. Such negative pulse output, when the amplitude of the input signal corresponds to values of the ramp waveform below the ground or other reference point RP, is provided by the relay I', the electrode 15''' of which is connected to a common point of connection of still a further resistance 3'' and a further capacitor 5''. The resistor 3'' is returned to the before-mentioned zero or reference ground potential, as indicated by the ground terminal $G_0$. The term "ground" as used herein is intended to connote not only actual earthing, but chassis or other reference potential, as well. The capacitor 5'' may be connected to the lower terminal of a further primary winding $P_2$ connected between the lower terminal of the primary winding $P_1$ and the capacitor $5''$. A bias-balancing resistor $21'$ and tap-off slider $23'$ may be provided in shunt with the winding $P_2$ for the relay $I'$. A secondary winding $S_2$, cooperative with the primary winding $P_2$ will also feed the amplifier stage 7, so that there will result at the output of the differential amplifier stage 7 amplified positive pulses the number of which is representative of the positive or negative amplitude of the original input signal at 1.

The transistors I and $I'$ thus provide a voltage comparator that enables the comparison of the input signal with the ramp waveform A and the production of both positive and negative pulses depending upon the positive-going or negative-going portions of the input signal relative to the various portions of the ramp waveform A.

The output of the differential amplifier 7 is fed by conductor 27, to the first of a plurality of amplifiers, shown as a transistor amplifier $A_1$ the base 2 of which is connected to the conductor 27; the collector 4 of which is connected through a resistor 6 to a source of potential, indicated by the mark +; and the emitter 8 of which is connected through a diode $D_1$ to the ground terminal $G_1$. The diode $D_1$ may be a reference diode for obtaining appropriate bias at the emitter 8. The collector 4 is also connected through a capacitor 10 and a diode $D_2$ to the ground terminal $G_2$. The capacitor 10 will become charged from the source + through resistance 6, a series-connected diode $D_3$, and a further shunt capacitor 12 that is connected to the ground terminal $G_3$. When an impulse, say a positive-going impulse, reaches the base 2, the transistor $A_1$ saturates and permits the capacitor 10 to discharge through the circuit including the amplifier $A_1$, the diode $D_2$ and the diode $D_1$. Whenever capacitor 10 is not so discharged, it will recommence charging through the diode $D_3$ and the capacitance 12, placing steps of charge accumulation, shown at waveform B, upon the capacitor 12. Successive pulses applied to the amplifier $A_1$ will thus result in the application of successively increasing step voltages B upon capacitor 12 until a voltage is accumulated that will cause conduction of the divider relay $A_1'$, the emitter 29 of which is connected to the junction of capacitance 12 and the diode $D_3$. Division of the input pulse train is thus produced; in this case, in a preferred ratio of one-to-ten, such that when the step-voltage charge B of the capacitor 12 reaches a ten-to-one value, the amplifier $A_1'$ will conduct and produce an output pulse having a division ratio of ten-to-one. The divider $A_1'$ is shown preferably of the unijunction type having its dual bases 31 and $31'$ respectively connected through resistors 33 and $33'$ to the + and $G_4-$ ground terminals. It is to be understood that all the ground terminals above-mentioned are connected together.

The output signal resulting from this ten-to-one division, is then fed through a diode $D_4$ to a further "and" gate II by conductor 35. The output of this gate is fed by conductor 37 to a flash tube driver 38, FIG. 1B, which may be of the type described, for example, in United States Letters Patent No. 2,977,508, issued Mar. 28, 1961 to Kenneth J. Germeshausen; or to any other desired trigger or switching circuit for ultimately operating a flash-illumination device 39, as of the multitrigger-grid type described in the said Letters Patent or of any other suitable well-known type.

The "and" gate II is enabled to produce an impulse along conductor 37 for energizing the flash-tube driver 38 only upon the simultaneous application to the input thereof, of an appropriate signal fed along conductor 43 from an index gate 45, later discussed.

Successive amplifiers, similar to the amplifier $A_1$, are schematically illustrated at $A_2$, $A_3$ and $A_4$, with corresponding divider circuits, of the ten-division type discussed in connection with capacitor 12 and relay $A_1'$, respectively shown at $A_2'$, $A_3'$ and $A_4'$. This set of amplifiers and dividers thus provides for the case of the four digits of the illustrated example of the present invention; it being understood, however, that more or less decades and other types of division systems other than decades, may, if desired, be employed. The successive counting decade units $A_1-A_1'$, $A_2-2'$, $A_3-3'$ and $A_4-4'$ are shown serially connected in conventional fashion and are fed by respective diode-containing conductors 35, $35'$, $35''$ and $35'''$ to the "and" gate II.

In accordance with the present invention, however, only one of the counting decade units $A_1-1'$, $A_2-2'$, $A_3-3'$ or $A_4-4'$ will at any one time energize the "and" gate II to produce a flash of illumination from the flash tube 39, as later explained. The computer logic of the invention requires that each of the amplifiers $A_1$, $A_2$, $A_3$ and $A_4$ is provided with further pulses from an external source that, after a predetermined counting time at which it is desired to effect a display period, will be fed to the respective amplifiers $A_1$, $A_2$, $A_3$ and $A_4$, in order to bring the counts stored therein up to, say, ten units for the particular example herein discussed. As an illustration, let it be assumed that the amplifier $A_1$ has counted only six pulses and that these six pulses are stored in capacitor 12. As before recounted, it is necessary for there to be ten pulses before the divider relay $A_1'$ will produce an output pulse for operating the "and" gate II and flashing the flash tube 39 through the driver circuit 38.

In accordance with the invention, four additional pulses are supplied to the base electrode 2 of the amplifier $A_1$ by a conductor 47 feeding from a later-described amplifier 49. These four additional pulses are generated, in accordance with the present invention, by means of a preferred mechanism involving a drum-like member 20, FIG. 1B, carrying thereupon a sequence of numerals, zero through nine. In the preferred form, the lateral walls of the drum 20 may be of opaque material with the numbers etched therein so that upon flash illumination of the flash-lamp 39 at the lower edge of the drum wall 20, a number becomes visible as an illuminated numeral. Clearly, reflected light or transmitted light, as hereinafter discussed in connection with the display system of FIG. 3, may be used, as well as other types of displays, including flat-disc displays, immediately evident to those skilled in the art.

Associated with the drum 20 and with each numeral thereon, is a post or similar device, such as, for example, the post $6''$, shown emerging above the region of the numeral 9 on the drum 20; the post $7''$ emerging above the region of the numeral 4; the post $9''$ emerging above the region of the numeral 6; and so on, in the illustrated example. A source of illumination, such as a lamp or a plurality of lamps 22 is employed to produce light that may fall upon photo-diodes or other light pick-up devices, illustrated at $L_1$, $L_2$, $L_3$ and $L_4$, except when one of the posts $6''$, $7''$, $9''$, etc., passes between the respective photo-diodes $L_1$, $L_2$, $L_3$ and $L_4$ and the source 22. At such times, the light is blocked and a signal impulse is produced. As an illustration, in connection with amplifier $A_1$, the photo-diode $L_1$ is shown connected by conductors $45'$ and $46'$, respectively, to the + terminal (before discussed in connection with the relay $A_1$) and to the further amplifier 49, FIG. 1A, the output of which is fed by conductor 47 to apply a further pulse to the base 2 of the amplifier $A_1$, as previously mentioned. The amplifier 49 and the conductor 47 are shown returned through a resistor 51 to a further ground terminal $G'$.

In the illustrated example of the 6 counts in the system $A_1-A_1'$, as the post $6''$, in response to rotation of the drum 20 in the direction of the arrow, under the control of the shaft S, passes the photo-diode $L_1$, an impulse is applied along connectors $45'$, $46'$ at the proper polarity for adding an additional impulse at the base electrode 2 of amplifier $A_1$, thus bringing the stored count in the capacitor 12 from the 6 counts to a value 7. As the drum further rotates, the post $7''$ will pass the photo-diode $L_1$ and produce a further impulse, bringing the count to 8. Finally, as the post 9″ passes the photo-diode $L_1$, another pulse will be produced bringing the count to ten and registering an output pulse at conductor 35 that, upon operation simultaneously with the proper-polarity from the index gate 45, produces a trigger impulse for energizing the flash-tube driver 38, flashing the lamp 39. In view of the proper positioning and coding of the posts with respect to the reference numerals, the numeral 6 that is present in the right-most position of the display region or area 40 will then be flash-illuminated.

There is thus displayed the complement (six) of the number of further pulses (four, in the above example) required to be fed to the amplifier $A_1$ to bring the count up to ten. Similarly, the diodes $L_2$, $L_3$, and $L_4$, etc., respectively, connected to feed through the amplifier 49, thereafter supply further pulses along the conductors 47′, 47″, 47‴ to the respective amplifiers $A_2$, $A_3$, and $A_4$, etc., effecting the adding of sufficient pulses to reach the ten count in each successive decade. The "and" gate II will accordingly be energized, producing a flash of illumination and illuminating the desired number in the desired place along the display or indicator region or area 40.

In order to enable the "and" gate II to operate only in the display period, there may be provided a further photo diode $L_5$, controlling the before-mentioned index gate 45, and which is illuminated from the lamp 22 when light is not blocked off by, for example, an elevated band or barrier 25, thus to control the index gate 45. During all other periods, the gate 45 will be "on," thus permitting energizing the "and" gate II, upon the application of the appropriate output from each of the decade counting units.

All four windows at the display area or region 40 will, of course, be illuminated at different intervals of time, and the numbers displayed therein will represent complements of the number of further pulses that had to be fed to the respective decades to cause the corresponding count therein to reach ten units of count. The successive flashing of the flash tube 39 may occur, for example, thirty times a second in each position, which is above the flicker limit of the eye; so that there will appear a continuity of all four digits, representing the stored count prior to the display period. The display period, in turn, will be a fraction of each revolution of the drum 20 in the illustrated example.

While the display of the invention has been illustrated as employing photo-diodes, it is clear that magnetic and other types of pick-up devices may be employed, as hereinafter discussed in detail in connection with the embodiment of FIGS. 2 to 5. Similarly, more than four units may be displayed, as also later discussed.

Figure 2:
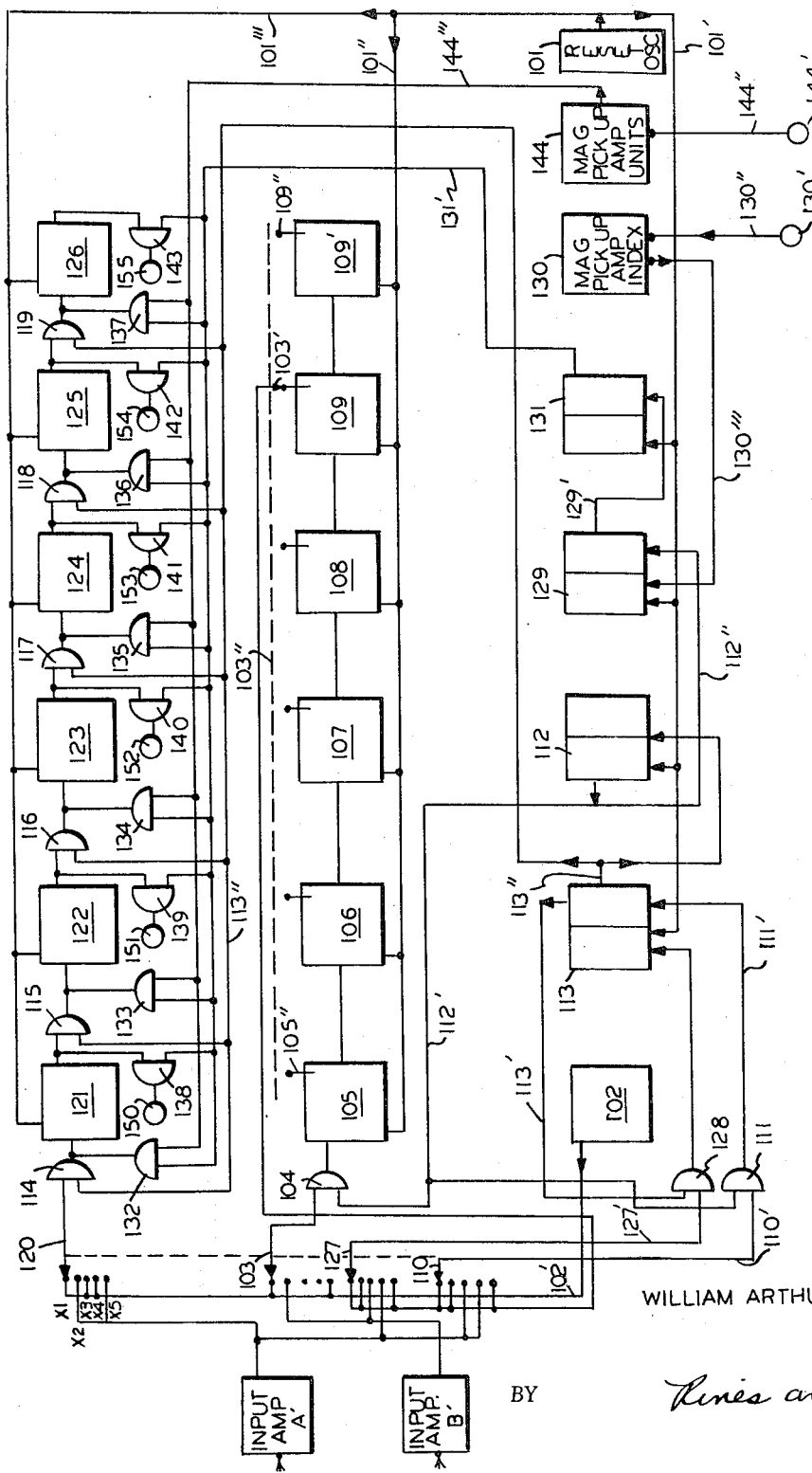
FIG. 2 is a block diagram of a high-speed counter embodying the method underlying the invention.

As previously intimated, the complementary logic system underlying the invention is also applicable to other types of counter devices, such as decade counters of extremely high-speed counting rates. In FIG. 2, accordingly, a counter embodying the invention with a modified drum-type flash-illuminated display is illustrated.

The counter of FIG. 2 embodies an upper chain of counting-and-storage decade scalers 121, 122, 123, 124, 125, 126; a set of time-base generator decade scalers 105, 106, 107, 108, 109, 109′; a set of gating-logic flip-flop circuits 113, 112, 129, 131; and multiple-position ganged selector switches 120–103, 127, 110 for enabling various later-described operations in each of five contact positions X1, X2, X3, X4 and X5.

A reset oscillator 101 generates a pulse that is fed by conductor 101′ to the gating-logic set of flip-flops 113, 112, 129, and 131; by conductor 101″ to time-base-generator-decade scalers, for example, of the flip-flop type, 105, 106, 107, 108, 109 and 109′; and by conductor 101‴ to the counting-and-storage decade scalers 121, 122, 123, 124, 125 and 126, to establish initial conditions for counting. The chains of decade counting circuits 105–109′ and 121–126 may, for example, be of the type manufactured by Hewlett Packard Company of Palo Alto, California and described in their operating and servicing manual "AC–4 Decade Counters," published May 1960; or the types 361–375 marketed by Transistor Specialties Incorporated of Plainview, Long Island, New York and described in their catalog 616, June 1961; or the type 728BN marketed by Computer Measurements Company, a division of Pacific Industries, Inc. of San Fernando, California, and described in their June 1961 catalog; or the type 1150A digital frequency meter marketed by the General Radio Company of West Concord, Massachusetts, described in the General Radio Experimenter of April 1962, vol. 36, No. 4.

Assume, now, one wishes to measure the frequency of a signal input into an input amplifier A′. In such case, switch contacts 120, 103, 127 and 110 will be moved to the fifth positions X5 down, so that the signal from input amplifier A′ feeds through contact 120 to gate 114 that is connected to the first decade 121. Time-base oscillator 102 feeds along 102′ through contact 103 into gate 104, that is, in turn, connected to the first time-base generator decade 105. The frequency of the oscillator 102 for a ten-megacycle counter, for example, permits an accuracy of a tenth of a microsecond in the operation of the counter.

In the drawing:

Gate 104 was initially opened by the reset pulse from the reset oscillator 101 through the gating flip-flop 112 by way of conductor 112′, allowing the signal from the time-base oscillator 102 to flow through the gate 104 into the series of decade scalers 105–109′. A further switch 103′ associated with the decade scalers, selects the time over which the frequency is to be measured. It is shown connected to the scaler 109, but it may also be connected, as indicated by the dash-line path 103″, to the other decade scalers 105–108 or 109′ to provide lesser and greater counting intervals, respectively, ranging from, say, $10^{-6}$ seconds at the contact 105″ to $10^{-1}$ seconds at contact 109″.

The time-base decades 105–109′ were initially set by the reset oscillator 101, as before described, so that the first pulse applied to 105 generates a signal at 103′ independent of the position of switch 103′. This setting corresponds to a 9-count in each scaler 105–109′. The signal at 103′ is fed through 127 and 110 (in the fifth contact position X5) by conductors 127′, and 110′ to the respective gates 128 and 111. Gate 128 is closed, however, by the output from the right-hand section of flip-flop 113, fed along conductor 113′; but gate 111 is opened by the output from the left-hand section of the next flip-flop 112, fed along 112′. Flip-flop 113 thus complements as a result of the output of gate 111, fed along 111′, generating a signal at 113″ that is fed to gates 114–119, opening the same and allowing pulses to flow into the series of decade scalers 121–126. These decade counters 121–126 count and store the information, as is well known, until gates 114–119 are closed by a change in state of flip-flop 113, effected by the second pulse from time-base generators 105–109′ by way of 103′, 127, 127′, through the then-opened gate 128 that complements the left-hand section of flip-flop 113.

At this time, the output at 113″ is fed into the complement input of the next flip-flop 112, changing its state. This, in turn, by conductor 112′, closes the gate 104 and the gate 111, and also triggers the right-hand side of the next flip-flop 129, by conductor 112″.

Figure 3:
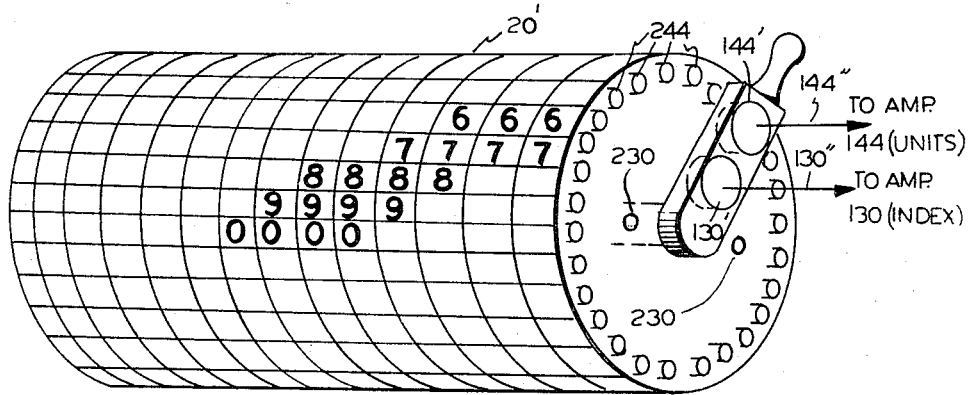
FIG. 3 is an isometric view of a modified drum display for use in the system of FIG. 2.
Figure 5:
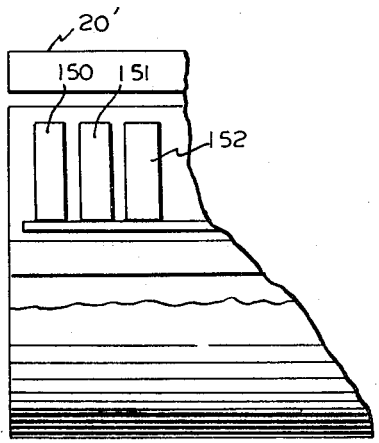
FIGS. 4 and 5 are respectively an end view and a fragmentary longitudinal section of the drum of FIG. 3.
Figure 4:
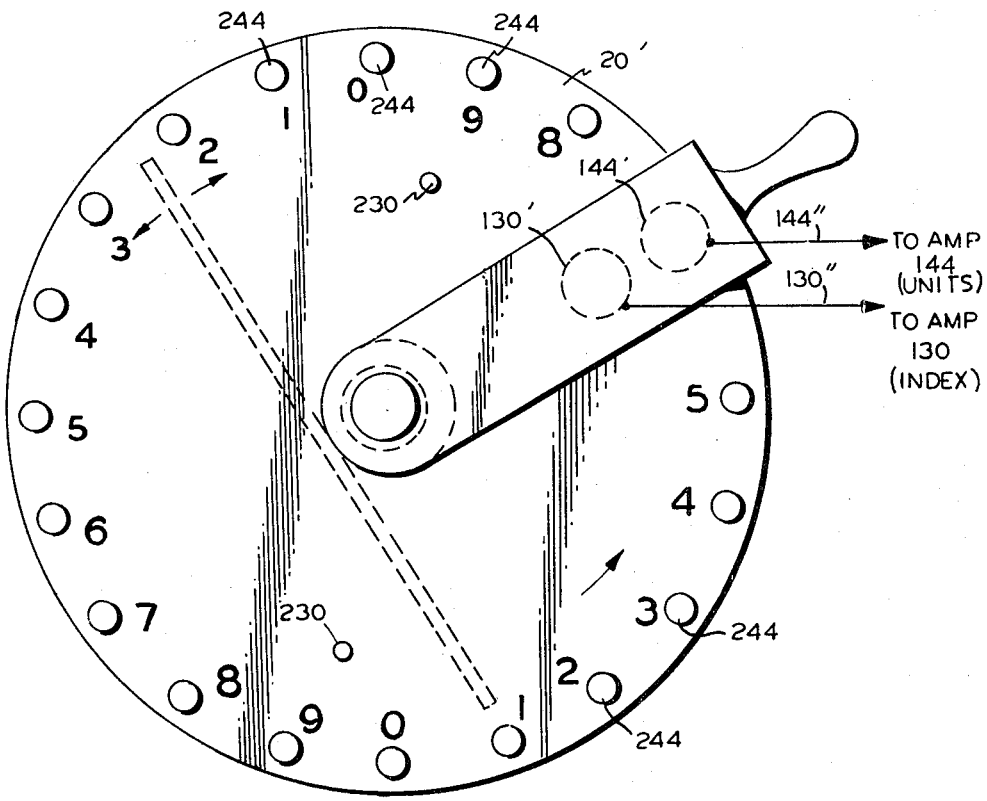

Meantime, the drum 20′ containing the numbers of the display, this time etched on opaque longitudinal strips, as shown in FIG. 3, has been spinning, and the output of an index magnetic pick-up 130′, FIGS. 2, 3 and 4, has been providing pulses, as the magnetic slugs 230, carried by the end plate of the drum at positions near the strip of display numbers "9," pass thereby. These pulses are fed along conductor 130″ to the amplifier 130, FIG. 2.

The output of the index amplifier 130 is fed by conductor 130''' to the flip-flop 129. These pulses occur every ten counts as a result of the before-described positioning of the magnetic slugs 230. Only after the pulse fed along 112'' arrives, will the indexing output fed along 130''' cause flip-flop 129 to change state and, by way of conductor 129', effect complementing of the next flip-flop 131. The output of 131, in turn, generates a signal fed along 131' to open each of gates 132–137 and gates 138–143.

In the meantime, the passing of a further plurality of magnetic slugs 244 or similar devices circumferentially mounted on the end plate of the drum 20' to be associated with each line of numbers, has been producing pulses in a further pick-up member 144' that are fed by conductor 144'' to amplifier 144. The output of this units or numbers amplifier 144 is fed along 144''', FIG. 2, to each of gates 132–137. These gates, however, were closed until the output occurred at 131', as before described. When gates 132–137 are thus opened, a count is added to each of the decade scalers 121–126. If, for example, a 9-count were stored in any one of the scalers 121–126, an output would be generated and applied to respective gates 138–143 which are now open, also; and a corresponding stationary flash-lamp (150–155, FIGS. 2 and 5), disposed within the drum in this embodiment, will be energized, illuminating a number or unit carried by the drum 20', (being "9" in the case just described).

The next number to rotate by is an "8." Coincident with this number passing, another pulse will be generated at 144' and fed by 144'' to the amplifier 144, and then fed by 144''' to gates 132–137. This pulse adds another count to each scaler 121–126; and if a "9" is now stored in one of the scalers, its flash lamp (150–155) will then be flashed to illuminate the "8"; and so on, for the remaining numbers.

This process continues indefinitely so that each ten pulses fed into 121 through 126 causes one output pulse which triggers appropriate flash tubes 150–155 by gates 138–143.

When the contacts 120, 103, 127, 110 are in switch position X2, the time-base oscillator 102 is removed from the circuit and the signal from a second input amplifier B' is substituted for the signal from 102. The ratio of inputs A' to B' (multiplied by some power of ten selected by switch 103') is thus measured and indicated.

In switch position X3, the time of signals between A' and B' is measured since the chain 105–109' becomes removed from circuit and the two pulses from A' and B' are substituted for the time-base generating scalers 105–109'.

In switch position X4, the time between two consecutive pulses at the input amplifier A' is measured. This is because 110 and 127 are then connected, and the inputs are fed in parallel such that the first pulse applied along 111' to 113 changes the state of 113, and the second pulse again changes the state of 113, closing gates 114–119.

With the ganged switch contacts 120, 103, 127, 110 in the X1 position shown, the pulses generated by the time-base oscillator 102 are transmitted through contact 103 and the inverting "and" gate 104 to the time-base generator decimal scalers 105, 106, 107, 108, 109 and 109', and the time-base generator 105–109' is set by the reset oscillator 101 such that each decade scaler thereof is at one count less than full. The first pulse fed to the time-base generator 105–109' from the time-base oscillator 102 will then reset the decade scalers 105–109' to zeros. This causes a pulse to be generated from each scaler which is transmitted through switch contact 110 to the inverting "and" gate 111. The coincidence of this pulse and the signal from the gating flip-flop 112 induced by the reset pulse from the oscillator 101, then causes a pulse to be generated by the "and" gate 111. This pulse is fed to the gating flip-flop 113. The resulting change in the state of the gating flip-flop 113 is sensed by inverting "and" gates 114, 115, 116, 117, 118, and 119, so that pulses from the time-base oscillator 102 will then pass through the "and" gate 114 and then into counter 121 by way of contact 120.

An output pulse is produced by counter 121 in response to the arrival of each group of a fixed number of input pulses. Thus, the number of output pulses is the number of input pulses divided by this fixed number. In the case of decade counters, the fixed number is 10, as previously explained.

The output pulses from 121 are, in turn, fed by way of "and" gate 115 to counter 122 where they are further divided and are then fed through 123, 124, etc. until the gating flip-flop 113 relaxes from its changed state.

The pulses from the time-base oscillator 102 likewise are counted by the time-base generator 105–109'. When the time-base generator has counted sufficient pulses such that it achieves the state first established by reset oscillator 101 (i.e. each scaler is one less than full), the next arriving input pulse will cause the scalers to set to zeros and an output pulse to be generated by each scaler. This second pulse from 109 thus occurs after some fixed number of input pulses following the first pulse which was fed into 105 (100,000 in this case of 5 decade scalers). Since the frequency of the input pulses to 105 is precisely controlled, the time interval between the first pulse into 105 and the second pulse from 109 is similarly precise and a precise time base is thus provided.

The above-mentioned second pulse from 109 is transmitted via contact 127 to inverting "and" gate 128 where it is amplified and inverted in polarity, and thence is fed on to the previously mentioned gating flip-flop 113. This second pulse causes 113 to relax from its changed state and in so doing to generate a pulse which is applied to gates 114–119 and 128, thereby closing them. The pulse from 113 is simultaneously applied to gating flip-flop 112, thereby causing it to relax from its changed state, and in so doing to generate a pulse which is applied to gates 111 and 104. The pulse from 112 is simultaneously applied to gating flip-flop 129, thereby changing its state.

Pulses obtained from the magnetic pickup indexing amplifier 130 are also applied to the gating flip-flop 129 in such a manner as to cause gating flip-flop 129 to stay in or revert to its initial state established by the reset oscillator 101. After gating flip-flop 129 has been changed in state by the pulse from gating flip-flop 112, however, the next arriving pulse from 130 will cause gating flip-flop 129 to revert to its initial state, and in so doing generate a pulse. This pulse is applied to gating flip-flop 131, thereby causing 131 to change its state and in so doing to generate a signal. This signal is applied to gates 132 through 143, thereby opening them.

The units magnetic pickup amplifier 144 now produces the first of its series of ten pulses as a "9" goes by the viewing window. If a "9" is stored in any counter 121 through 126, a pulse fed into that counter through its respective gate 132 through 137 will produce an output pulse through its respective gate 138 through 143, and flash its respective lamp 150 through 155, causing the numeral "9" to be illuminated in the window, as before-described.

If a "9" is not stored in some counter, the pulse from 144 will advance that counter by one count. The next number rotating by the viewing window is "8." If the count is now "9" in any counter, the "8"-pulse will similarly cause a lamp to flash, thus illuminating that "8" in the window. In this way, as previously explained, each counter is read-out by interrogating it with a series of pulses (10 in the case of decimal counters) to determine how many of these pulses, when added to the original number stored, fills that counter and causes an output pulse to be generated and produced through its respective gate 138–143, thereby causing its respective lamp to flash. This is, of course, the same kind of complementing logic employed in the system of FIG. 1.

The complement must, in accordance with the invention, be added to the stored count to read-out the stored count and the stored count is identified by its complement. The counters 121–126 continue to operate in the same manner so long as inverting "and" gates 114–119 are closed and inverting "and" gates 138–143 are open, with the unit amplifier 144 producing pulses. This action will stop when reset oscillator 101 produces another pulse.

A further example of a convenient type of high-speed counting circuit for use in accordance with the teachings of the present invention is shown in FIG. 6, wherein a combination of a tunnel-diode flip-flop circuit 302 (such as that described on page 54 of the General Electric Company "Tunnel Diode Manual," 1961) and a series-connected tunnel diode five-to-one frequency divider or staircase-wave generator 311 is employed. This circuit further illustrates the versatility of the complementary counting logic of the present invention by employing, for illustrative purposes, a more conventional type of read-out, generalized as a display 301; though it is to be understood that the displays of the other embodiments of the invention may equally well be employed, as discussed in connection with the embodiments of FIGS. 1 and 2. The combination of the flip-flop 302 and the five-to-one divider, thus provides a ten-unit or decade counting circuit that produces an output pulse every ten counts.

Input pulses, FIG. 6A, applied at 306 are fed through an "and" gate 308, such as the type previously discussed, or as described on page 129 of the General Electric Company "Transistor Manual," fifth edition, 1960, to the flip-flop circuit 302, producing the output shown in FIG. 6B, at one-half the pulse frequency of the input pulses. This output is applied by way of coupling capacitor 303 to the uppermost tunnel diode 304a of a series-connected chain of tunnel diodes 304a through 304e such as the type TD3 (General Electric Company), with the diode 304e having the highest peak current so as to be actuated last in the chain. In operation, the diodes 304a through 304e are biased from a constant-current source $E_{BB}$ of magnitude less than the peak currents of the diodes, so that all the diodes are in the low-voltage state. Each positive pulse of the train, FIG. 6B, causes one of the tunnel diodes 304a, 304b, 304c or 304d to switch to the high-voltage state, and the fifth pulse switches the lowermost diode 304e to turn on the transistor through the delay line D, thus resetting the circuit by substantially grounding the collector 310 of the transistor T. The further division by a factor of five, represented by the waveform of FIG. 6C, is thus produced at the collector 310 and is fed to the further "and" gate 308' by conductor 312.

Another flip-flop circuit 302', for insuring that signals are fed to the flip-flop 302 only from the input circuit 306 or from the hereinafter-described complementary signal generator 314, but not both simultaneously, feeds its complementary outputs to the "and" gate 308 and to still a further "and" gate 308" connected between the input to the flip-flop 302 and the output of the complementary signal generator 314. After a predetermined time interval of counting, the flip-flop 302' will complement, preventing further impulses from being fed to the decade counter 302–304, and opening gate 308" to permit the necessary pulses from the complementary signal generator 314 to be applied through the "and" gate 308" to the flip-flop 302 to complete the impulse counting through ten counts; i.e. to supply the necessary complementary number of impulses. The complementary signal generator 314 also feeds through "and" gate 308' to the conventional decade scaler 316 (as of the before-described type) that stores the complement and operates the display 301 of any desired type, including Nixie tubes and the like, or the type of display of FIGS. 1 and 2–5. The resulting output at 312 upon the supplying of sufficient impulses to reach a count of ten, closes the "and" gate 308', prohibiting further pulses from the complementary signal generator 314 feeding the decade scaler 316.

It is significant that, without the complementary logic sequence of the present invention, displays such as the Nixie tube and the like cannot be used with the tunnel-diode pulse-frequency divider type of circuit 311, even though such a circuit is highly desirable because of its high frequency of operation. This is true since there is no reliable way of ascertaining the order of switching of the diodes 304a–304d. The present invention, however, through use of the complementary logic, enables such high-frequency circuits to be employed, responding to the output after ten counts without regard to the order of diode switching. Great savings in number and size of components are thus achievable.

Figure 7:
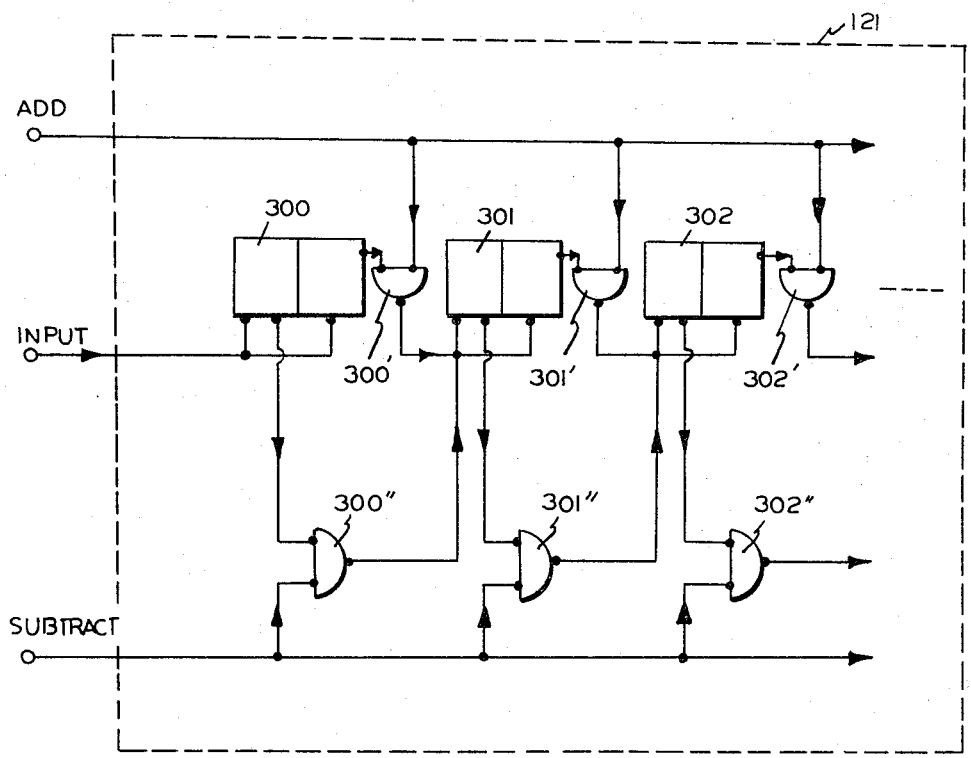
FIG. 7 is a circuit diagram of a modified counting-and-storage circuit.

Alternatively, the further pulses applied to the count present in the counting-and-storing decades of each of the systems of FIGS. 1A–1B, 2 and 6, preceding the indicating or display period, could be of opposite polarity so as, in effect, to subtract from the stored count a sufficient number of further impulses to cause the decade to reach, for example, a resultant zero (or ten) count. The number of subtracted impulses so required, may then be used, as before-described, to indicate such actual count. As an illustration, the counting-and-storing circuits 121, 122, 123, etc. of FIG. 2 may each be modified as shown in FIG. 7 to provide for the possibility of subtracting the stored count and thereby indicating the same. In the circuit of FIG. 7, there is illustrated a binary up-down counting system of the type described, for example, on pages 26 and 27 of "Digital Logic Handbook," published March 1962 by Digital Equipment Corporation of Maynard, Massachusetts. Conventional serially connected flip-flop stages 300, 301, 302, etc. are employed with respective pairs of gates 300'–300", 301'–301", 302'–302", etc. for permitting subtraction of impulses from the magnetic pick-up amplifier of FIG. 2. When the line labelled "add" is energized (as during counting-and-storage interval), impulses fed along the line labelled "INPUT" will be added to the stored count through gates 300', 301', 302', etc., in the manner described in connection with the system of FIG. 2; but when the "subtract" line is energized (as during the indicating period), any "INPUT" impulse will be subtracted from the stored count by application of the same through gates 300", 301", 302", etc.

A logic sequence for storing and displaying with the modified circuit of FIG. 7 may be as follows: The impulses to be counted are applied to the "INPUT" conductor when the "add" line is energized, thus allowing counts to be stored in the circuit 121. At the end of a counting interval, prior to the indication or display period, the "subtract" line is energized and further impulses are fed via gates 300", 301", 302", etc. of polarity such as to effect subtraction until the stored count reaches zero. Indicating or displaying the number of further impulses thus required to be subtracted to reduce the count to zero provides a reading of the counts stored during the counting period, prior to the subtraction process.

Further modifications will also occur to those skilled in the art and all such are considered to fall within the spirit and scope of the invention as defined in the appended claims.

What is claimed is:

1. An electric system comprising a rotatable drum carrying a series of indicia along its circumference, means comprising an element rotatable with said drum for producing an index pulse in response to the rotation of said element past a predetermined location, means comprising a series of elements rotatable with said drum for producing sequential pulses in response to the rotation of said series of elements past a predetermined location, data storage means, a bistable control circuit connected to said storage means and adapted to place said storage means in read-out condition, said control circuit being connected to said index pulse-producing means and being responsive thereto to produce said read-out condition when said control circuit is in one but not the other of its states, said storage means being connected to said sequential pulse-producing means and being responsive thereto to produce data output signals only when in said read-out condition, reset means operable independently of said drum for resetting said storage means and for placing said control circuit in the other of said states, means operable independently of said drum after actuation of said reset means for commencing a data read-in period for said storage means and for thereafter terminating said read-in period and automatically placing said control circuit in said one state, and means dependent upon said data output signals for repetitively and indefinitely illuminating indicia of said drum in response to the data stored in said storage means until said reset means is actuated.

2. The electric system of claim 1, said means for commencing and terminating said read-in period comprising a time-base generator circuit initially actuated by said control circuit and later actuating said control circuit.

3. The electric system of claim 2, said time-base generator circuit being connected to said reset means and being reset when said reset means is actuated.

4. The electric system of claim 1, said means for commencing and terminating said read-in period comprising means for applying input pulses to said system.

References Cited by the Examiner

UNITED STATES PATENTS

| | | | |
|---|---|---|---|
| 2,510,093 | 6/1950 | Ferguson et al. | 340—380 |
| 2,510,485 | 6/1950 | Vossberg | 340—380 |
| 2,633,297 | 3/1953 | Quinby et al. | 235—92 |
| 2,743,419 | 4/1956 | Chatterton et al. | 235—92 |
| 2,757,862 | 8/1956 | Boyden et al. | 235—154 |
| 2,772,048 | 11/1956 | Collison et al. | 235—154 |
| 2,843,840 | 7/1958 | Brinster et al. | 235—92 |
| 2,853,235 | 9/1958 | Brinster et al. | 235—92 |
| 3,023,957 | 3/1962 | Goodman | 235—92 |
| 3,064,889 | 11/1962 | Hupp | 235—92 |
| 3,129,322 | 4/1964 | Sarratt | 235—92 |
| 3,158,854 | 11/1964 | Keen et al. | 235—92 |

DARYL W. COOK, *Acting Primary Examiner.*

MALCOLM A. MORRISON, *Examiner.*

J. F. MILLER, *Assistant Examiner.*